United States Patent

Staudenrausch

[11] Patent Number: 5,147,239
[45] Date of Patent: Sep. 15, 1992

[54] METHOD AND APPARATUS FOR MAKING SAUSAGES

[75] Inventor: Georg Staudenrausch, Biberach an der Riss, Fed. Rep. of Germany

[73] Assignee: Albert Handtmann Maschinenfabrik GmbH & Co. KG, Biberach/Riss, Fed. Rep. of Germany

[21] Appl. No.: 723,953

[22] Filed: Jul. 1, 1991

[30] Foreign Application Priority Data

Sep. 6, 1990 [DE] Fed. Rep. of Germany ....... 4028343

[51] Int. Cl.⁵ .............................................. A22C 11/10
[52] U.S. Cl. ........................................ 452/47; 452/30
[58] Field of Search ............... 452/47, 46, 30, 31

[56] References Cited

U.S. PATENT DOCUMENTS

| | | | |
|---|---|---|---|
| 3,191,222 | 6/1965 | Townsend | 452/47 |
| 3,694,853 | 10/1972 | Greider | 452/47 |
| 4,112,546 | 9/1978 | Müler | 452/47 |
| 4,517,786 | 5/1985 | Barker | 452/47 |
| 4,539,796 | 9/1985 | Nakamura et al. | 452/47 |
| 4,730,367 | 3/1988 | Vinokur | 452/47 |

FOREIGN PATENT DOCUMENTS

| | | |
|---|---|---|
| 1069487 | 11/1959 | Fed. Rep. of Germany . |
| 1782751 | 2/1973 | Fed. Rep. of Germany ........ 452/47 |
| 2605745 | 8/1977 | Fed. Rep. of Germany . |
| 2214413 | 1/1974 | France . |
| 2620902 | 9/1987 | France . |
| 524314 | 8/1972 | Switzerland . |

*Primary Examiner*—Willis Little
*Attorney, Agent, or Firm*—Finnegan, Henderson, Farabow, Garrett & Dunner

[57] ABSTRACT

In a method for making sausages, in which the sausage meat exiting from a filling machine is filled into a sausage skin pulled off a skin caterpillar to form a sausage rope and the rope is then divided into individual sausages by twisting it between every two adjacent sausage portions, the improvement wherein the spacing in the skin between each two adjacent sausage portions in the rope is increased by pulling the leading sausage portion forwards together with the sausage skin at a speed greater than the sausage meat expulsion speed during the dividing operation.

3 Claims, 2 Drawing Sheets

METHOD AND APPARATUS FOR MAKING SAUSAGES

The invention relates to a method for making sausages, in which sausage meat exiting from a filling machine is filled into a sausage skin pulled off a skin caterpillar, to form a sausage rope which is then divided into individual sausages by twisting it between every two adjacent sausage portions.

The operation of dividing a sausage rope by twisting it requires relatively great amounts of sausage meat to be displaced from the twisting location, resulting in the formation of considerably deformed sausage ends. This operation moreover requires the exertion of a relatively large torque, so that there is the danger of the sausage skin being damaged at the location of the sausage ends. These disadvantages appear when making sausages of any caliber, and are particularly serious when making sausages of larger calibers.

It is an object of the present invention to improve the method defined above so that the sausage ends are not deformed during the twisting operation, and there is no danger of the sausage skin being damaged.

In a method of the type defined above, this object is attained according to the invention by providing an increased spacing between each two adjacent sausage portions by pulling the leading sausage portion forwards together with the speed the sausage skin at a speed greater than the sausage meat being filled into the skin during or at the time of the dividing or twisting operation.

In practice, this requires that between each two adjacent sausage portions during the dividing operation, a short length of the sausage skin be pulled off the spout on which the unstuffed sausage skin caterpillar is retained, so that at the time of the twisting operation, a length of the sausage skin will exist between two sausage portions that has a substantially reduced amount of sausage meat filling or no filing at all.

When the expulsion of the sausage meat from the filling machine occurs portion-wise in a pulsating rhythm, the sausage skin may be pulled forwards at a substantially constant speed approximately corresponding to the maximum sausage meat expulsion speed. When on the other hand the expulsion of the sausage meat is carried out at approximately constant speed, i.e. in the case of a constant sausage meat flow, the speed at which the sausage skin is pulled forwards may be increased during the twisting operation.

In either of these cases, individual sausage portions are obtained and the spacing between each two adjacent sausage portions is increased. Even when the expulsion of the sausage meat is carried out at an approximately constant speed, it is still possible to twist the sausage rope between two adjacent sausage portions, because the spacing between each two adjacent sausage portions will have been increased.

The invention also relates to an apparatus for performing the methods described above, comprising at least a filling machine and a twisting mechanism downstream thereof, wherein a substantially continuously driven conveyor mechanism acting at least on a leading one of the sausage portions of disposed downstream of the twisting mechanism as viewed in the conveying direction, the conveying speed being either constant (pulsating expulsion of the sausage meat), or adapted to be increased during the dividing operation (continuous expulsion of the sausage meat at constant speed).

Further characteristics and advantages of the invention will become evident from the following description of an embodiment of the invention, given by way of example with reference to the accompanying drawings, wherein.

Figure 1:
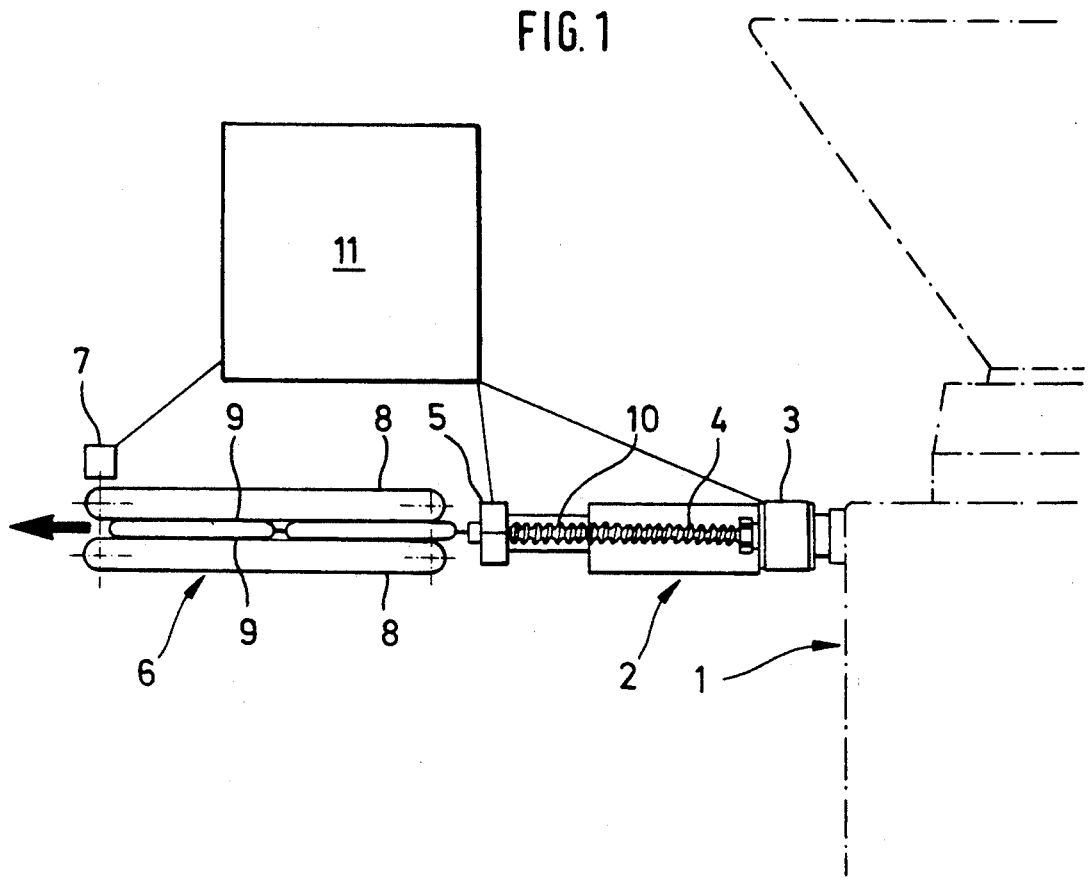
FIG. 1 is a diagrammatic side view of the apparatus according to the invention.

The apparatus shown in FIG. 1 of the drawings by way of example comprise a filling and portioning machine 1 (illustrated in dotted lines) of conventional construction, which could also be separately operated by itself.

Disposed downstream of filling an portioning machine 1 and connected thereto in the conventional manner is a twisting mechanism generally indicated at 2 and comprising a twisting gear mechanism 3 for rotating a spout 4, and a brake ring gear mechanism 5. Disposed downstream of twisting mechanism 2 and spaced therefrom by a certain distance is a conveyor means or mechanism generally indicated at 6. Conveyor mechanism 6 is of conventional construction and comprises two spaced endless conveyor belts 8 extending parallel to one another and adapted to be driven by a motor 7, so that the leading end of a sausage portion is received between the two facing conveyor runs 9 of the belts 8 and advances in the direction of the arrow. An electronic control means or unit 11 is provided for controlling motor 7 in such a manner that the two conveyor belt 8 are continuously driven.

Twisting mechanism 2 may be driven by a separate (variable-speed) drive source or by the drive mechanism of filling machine 1.

Figure 2:
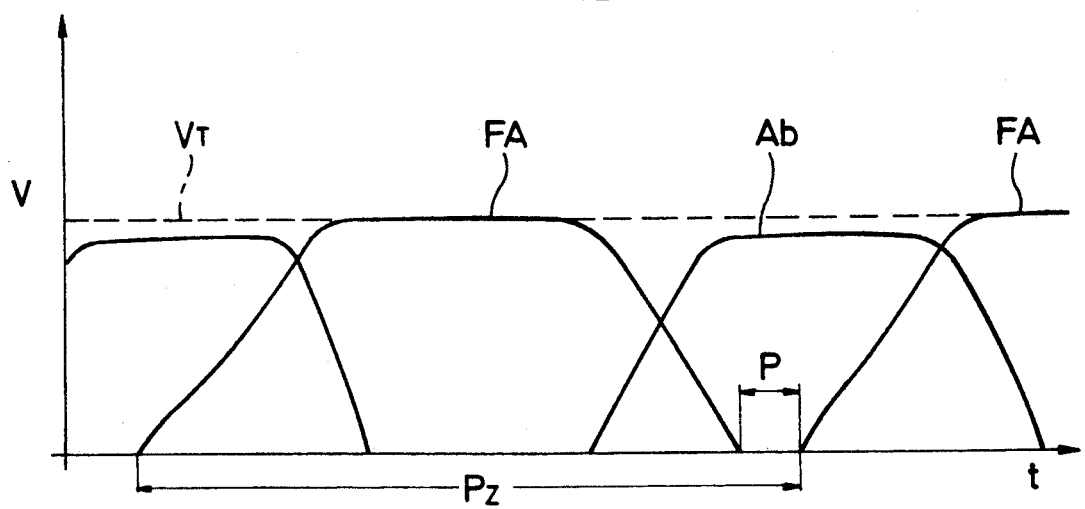
FIG. 2 shows a time vs. speed diagram.

FIG. 2 shows a time vs. speed diagram corresponding to the performance of the method according to the invention in the following manner: The filling operation is carried out intermittently, i.e. by supplying successive sausage meat portions. The sausage meat expulsion operation is indicated by a curve FA. Successive sausage meat expulsion cycles are separated from one another by an interval P. The operating speed of conveyor belts 8 is indicated by a dotted line VT. This speed is substantially constant and corresponds approximately to the sausage meat expulsion speed.

A full portioning cycle is designated by PZ.

The dividing or twisting operation is illustrated by the twisting curve Ab having its maximum substantially at the beginning of interval P, so that the most important part of the twisting operation, namely, its beginning, coincides with the interval. The fact that the twisting curve Ab extends into the beginning phase of the succeeding sausage meat expulsion cycle has been found to be irrelevant with regard to the performance of the twisting operation.

The time selected for the interval P may be very short, for instance up to 60 ms.

As long as the sausage meat expulsion operation FA proceeds at its maximum speed, the expulsion speed approximately corresponds to the conveying speed VT.

As soon, however, as the expulsion speed is reduced, a perceivable difference is created between the conveying speed VT and the expulsion speed FA. This means that the expelled amount of sausage meat is quickly reduced, while the sausage meat portion together with the sausage skin continues to be conveyed at the unchanged conveying speed VT, as a result of which a certain length of sausage skin is pulled of the spout on which the sausage skin caterpillar 10 is carried, this length of skin being barely filled by the tailings of the previously expelled sausage meat. The twisting operation thus causes only a small amount of sausage meat to be displaced, so that the end of the sausage is not deformed, and the twisting operation can be carried out very gently and with a relatively small force.

The action of pulling a length of sausage skin off the sausage skin caterpillar 10 results in the creation of a wider spacing in the skin between two sausage portions, so that the twisting location is of greater length than in the conventional twisting operation.

It has been found that the described method can also be performed when successive expulsion cycles are carried out without an interval therebetween, in that case the sausage meat flow being only reduced at the locations between successive sausage portions, i.e. the expulsion speed is sharply reduced but not stopped at these locations. The resulting speed difference relative to the conveying speed still VT is sufficient to cause a length of sausage skin to be pulled off the sausage skin caterpillar 10 in the manner described above.

Of course, additional lengths of sausage skin being pulled off the caterpillar 10 during the filling intervals.

Figure 3:
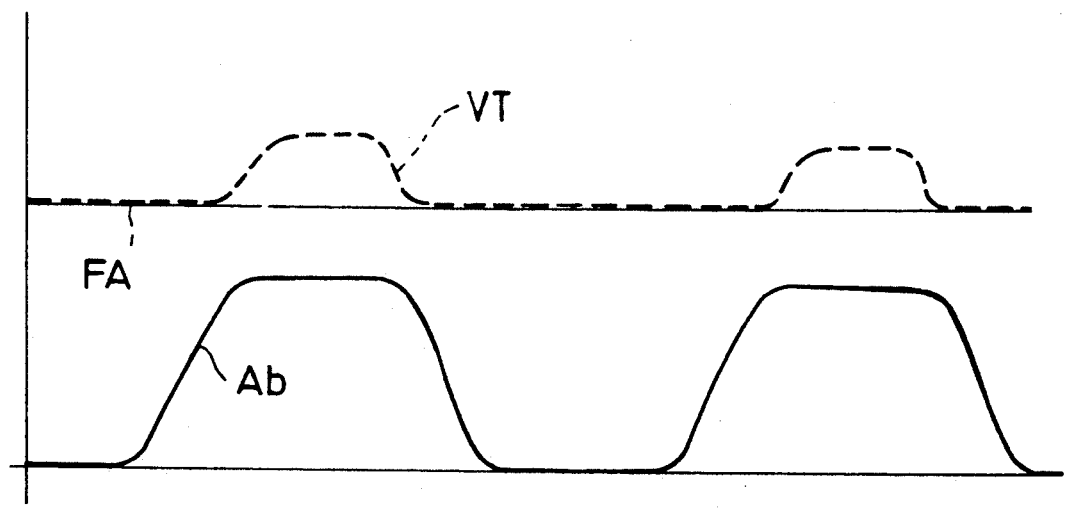
FIG. 3 shows an alternative time vs. speed diagram.

In the embodiment according to FIG. 3, the filling material, i.e. the sausage meat, is expelled at a constant speed FA, resulting in a constant filling material flow.

The conveying speed VT substantially corresponds to the sausage meat expulsion speed FA at the locations other than the twisting locations.

The conveying speed VT is sharply increased, however, at the twisting locations (twisting speed curve Ab). As a result, the sausage skin is no longer being firmly filled at the twisting location to thereby permit the twisting operation to be performed at these locations. This likewise results in a portioning effect by increasing the spacing between successive portions.

An additional advantage results from the fact that in the course of the sausage meat expulsion the conveyor belts 8 act to convey each portion over the same distance while the sausage skin 10 is pulled off the spout 4 during this time. This results in the formation of sausages of equal length, each twisting operation being carried out after sausage skin pieces of the same length have been pulled of the supply.

The electronic control unit 11 also controls the variable-speed electric motor 7, i.e. the drive source for the conveyor belts 8, so that the motor 7 can be controlled in accordance with the operation of the brake ring gear mechanism 5 and twisting mechanism 3 as well as the portioning system.

The invention may of course also be applied to the processing of pasty products other than sausage meat.

What is claimed is:

1. In method for making sausages, in which sausage meat is expelled from a filling machine and filled into sausage skin being pulled off a skin caterpillar to form a sausage rope and the rope is then divided into individual sausages by twisting it between every two adjacent sausage portions, the improvement comprising pulling forwards a leading sausage portion together with the sausage skin downstream of the twisting step at a speed greater than the speed of expulsion of the sausage meat from the filling machine during the twisting step to increase the spacing in the skin between each two adjacent sausage portions.

2. The method of claim 1, wherein the sausage meat is being expelled from the filling machine in a pulsating manner to form separated sausage portions in said rope, said leading sausage portion and skin being pulled forwards downstream of the twisting step at a substantially constant speed approximately equal to the maximum sausage meat expulsion speed to thereby form said increased spacings in the skin between adjacent sausage portions during the twisting step.

3. The method of claim 1, wherein the sausage meat is being expelled from the filling machine at an approximately constant speed, said leading sausage portion and skin being pulled forwards downstream of the twisting step at a speed approximately equal to the sausage expulsion speed except during the twisting step when it is pulled forwards at an increased speed to thereby form said increased spacings in the skin between adjacent sausage portions during the twisting step.

* * * * *